United States Patent
Stockman et al.

[11] Patent Number: 5,774,617
[45] Date of Patent: Jun. 30, 1998

[54] OPTICAL FIBRE MANIFOLD

[75] Inventors: Anthony John Stockman, Woodbridge; Simon Charles Tristan Benton, Felixstowe; Matthew John Polaine, Cambridge, all of United Kingdom

[73] Assignee: Miniflex Limited, United Kingdom

[21] Appl. No.: 535,167

[22] PCT Filed: Apr. 26, 1994

[86] PCT No.: PCT/GB94/00938

§ 371 Date: Dec. 15, 1995

§ 102(e) Date: Dec. 15, 1995

[87] PCT Pub. No.: WO94/25886

PCT Pub. Date: Nov. 10, 1994

[30]    Foreign Application Priority Data

Apr. 27, 1993  [GB]  United Kingdom .................... 9308689

[51] Int. Cl.$^6$ ..................................................... G02B 6/36
[52] U.S. Cl. .......................................................... 385/134
[58] Field of Search ................................ 385/65, 83, 45, 385/54, 71, 76, 77, 89, 49, 134, 135, 136, 137

[56]              References Cited

FOREIGN PATENT DOCUMENTS

| 0410181 | 1/1991 | European Pat. Off. .................. 385/65 |
| 61-113010 | 5/1986 | Japan ...................................... 385/83 |
| 61-113011 | 5/1986 | Japan ...................................... 385/83 |
| 1-297603 | 11/1989 | Japan ...................................... 385/83 |
| 1425264 | 2/1976 | United Kingdom ..................... 385/83 |

OTHER PUBLICATIONS

Noane; "Low Loss Optical–Fiber Connectoion System"; Elctronics Letters, vol. 15, No. 1; pp. 12–13, Jan. 4, 1979.

*Primary Examiner*—John Ngo
*Attorney, Agent, or Firm*—Dorn, McEachran, Jambor & Keating

[57]              ABSTRACT

A manifold for breaking out optical fibers from a multifiber bundle has at least one input channel and several output channels. The channels are initially laterally open so that fibers can be laid in the channels without having to thread a fiber end through an aperture, and can then be closed once the fiber has been laid in, to retain fiber.

13 Claims, 3 Drawing Sheets

OPTICAL FIBRE MANIFOLD

This invention relates to an optical fibre manifold for "breaking out" individual fibres or fibre groups from a multi-fibre bundle carried by a single cable element tube. Such manifolds are also sometimes called 'break-outs'.

In order to separate out individual fibres or groups of fibres from a multi-fibre bundle, it is necessary to provide distinct discrete paths by which the separated fibres can pass to their intended destinations. It is important that the manifold be physically of small dimension, that it be easy to fit in relation to the fibres and that it should guide the fibres without subjecting them to undue bending. It always has to be borne in mind that optical fibres are extremely fragile.

According to the present invention, there is provided an optical fibre manifold having an inlet channel and a plurality of outlet channels communicating with the inlet channel, the manifold having components moveable between an assembly position and an in use position, wherein in the assembly position fibre can be placed laterally into the inlet channel and into the outlet channels and in the in use position the lateral access to the inlet and outlet channels is closed.

Each fibre passage leading, within the manifold, from an inlet to an outlet is preferably configured to guide the fibre through the passage in such a way as to avoid any impairment of the optical and/or mechanical performance characteristics of the fibre.

By allowing lateral entry of the fibre into the channels, the advantage is obtained that the fibre does not have to be threaded through the manifold. As a result it is not necessary to have access to the fibre ends, and it is easier to handle the fibres with the necessary care to avoid damaging them.

The manifold may have any number of inlet channels and any number of outlet channels. However there will always be more outlet channels than inlet channels. In most cases however there will be a single inlet channel with a plurality of associated outlet channels. The invention is not limited to any particular number of inlet or outlet channels, or to any particular ratio of numbers of inlet to numbers of outlet channels.

The manifold of the invention may also be used as a fibre 'combiner', ie to direct a plurality of separate fibres entering the manifold through the 'outlet' channels into a lesser number of fibre streams leaving the manifold through the 'inlet' channel.

The manifold may be designed so that it can be combined with other manifolds. Where a plurality of cable element tubes are to have their fibres broken out at the same place, a number of manifolds, each with an inlet channel, can be connected together to form a single manifold structure.

The manifold may comprise a plastics moulding which can be moved between the in use and assembly positions by exercising live hinges which form part of the moulding. The action of opening and closing the moulding about the live hinge may open and close a lateral access channel.

Lateral access channels may also be closed by applying a lid or sleeve to the manifold structure.

Either the inlet channel or the outlet channels or both may include means for connection to a bend limiting sleeve along which a cable element tube can be passed. The connection means may retain the bend limiting sleeve to provide a secure connection between the manifold and the bend limiting tube.

The channels preferably have a large diameter mouth and a smaller diameter fibre routing section aligned with the mouth. Each mouth may be a bell-shaped mouth with radiused edges to prevent the fibre being bent sharply, or may be a cylindrical section adapted to receive an end of a cable element tube, which may be a bend-limiting tube, within which the fibre is carried. Such a cylindrical section can have a diameter of 5 mm or 6 mm, or other diameter depending on the cable element tube which is used.

The fibre routing section should be capable of accommodating one or more fibres. It is important that the fibre routing section ensures that the fibre is nowhere bent through a radius smaller than 30 mm. This limitation applies not only to the centreline of any channel, but also to any surface irregularity on the channel walls.

The fibre routing section preferably includes at least one fibre retention tab which extends across the channel. The fibre can be manoeuvred beneath the tab to fit in the channel when the fibre is laid in, but is hindered from exiting the channel by the presence of the tab.

The manifold is preferably made from plastics and can conveniently be made either by injection moulding or by vacuum forming. At least one face of the manifold (possibly the cover) may be transparent so that the manifold contents can be viewed without disassembly.

The surfaces of the channels should be smooth so that fibres are not caused to travel around any surface irregularity which might place local mechanical stresses in the fibres. The surface finish can be specified in terms of a centre line average (CLA) of 0.4 mm. The form of the channels should also fall within a geometric form tolerance of 0.2 mm. All manifold edges which will encounter fibre should have a radius of about 0.05 mm.

The inlet and outlet channels may be parallel with one another or may be divergent.

The invention will now be further described, by way of example, with reference to the accompanying drawings, in which:

FIG. 1 shows an optical fibre manifold in an assembly position;

FIG. 2 stows the manifold of FIG. 1 with a cable element tube and fibres broken out from the tube;

Figure 1:
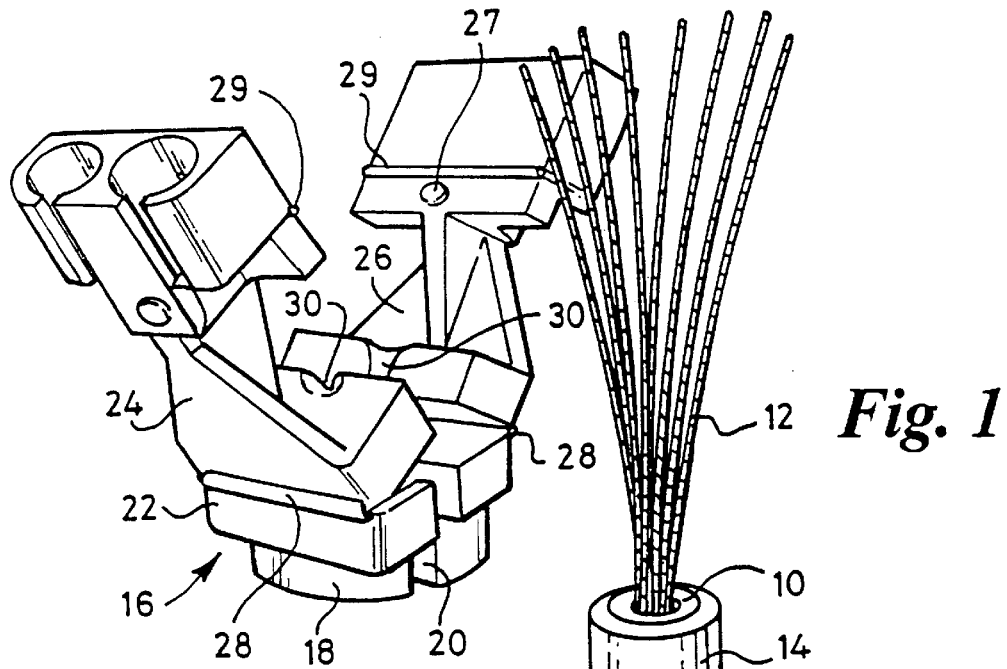

FIG. 1 shows a cable element tube 10 which forms a common sheathing for eight separate optical fibres 12. The tube 10 is received within a bend limiting sleeve 14 which prevents the tube 10 being bent through a radius smaller than can be accommodated by the fibres, without damaging the fibres. A manifold 16 is shown in proximity to the tube 10. The manifold is intended to handle the splitting of the fibres 12 into four separate groups of two fibres, as can be seen in FIG. 2, to provide a jacket around the fibres, to lead them in the correct direction and to protect them from damage.

Figure 3:
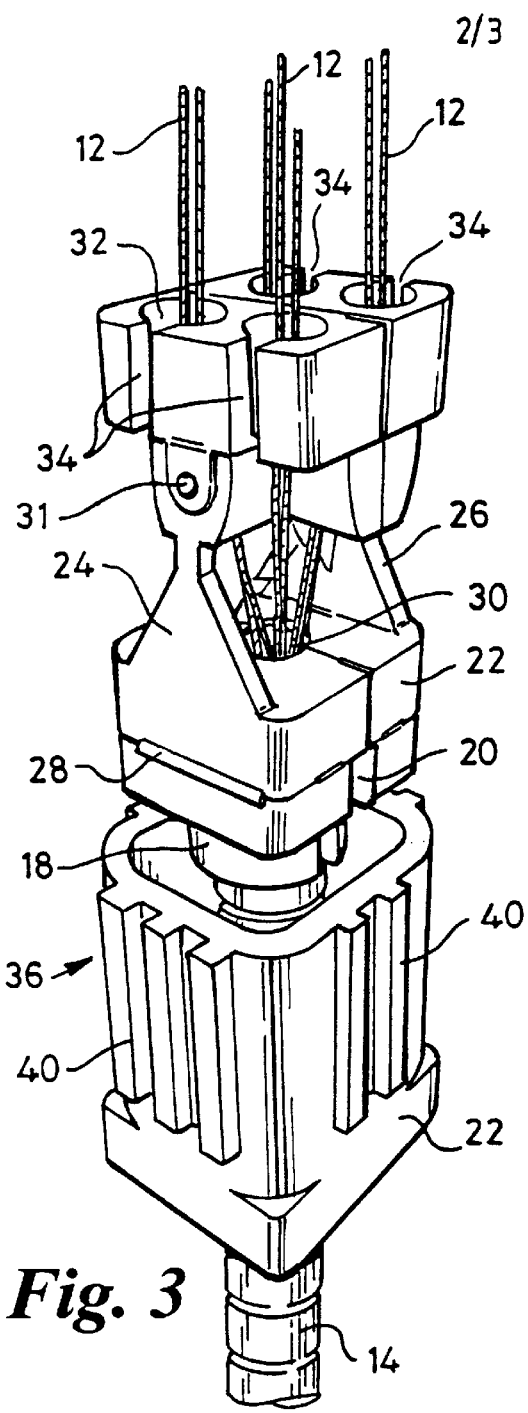
FIG. 3 shows the manifold of FIGS. 1 and 2 in a last stage of assembly.

The manifold has a base 18 with a radial slot 20. The bottom end of the base is circular and is surmounted by an upper region 22 of generally square cross-section. Two arms 24 and 26 are hinged to the base 18 through live hinges 28 and, in the position shown in FIG. 1, these arms are hinged back to allow the fibres 12 to be introduced centrally into the manifold through the slot 20. However as can be seen in FIG. 3, when the arms 24, 26 are hinged back to the "in use" position, they mate with one another so as to effectively close the lateral access provided by the slot 20. However the mating faces of the arms 24, 26 have a central aperture 30 with a bell-shaped mouth which has a radius which is designed to control the extent to which the individual fibres 12 can be bent.

Figure 2:
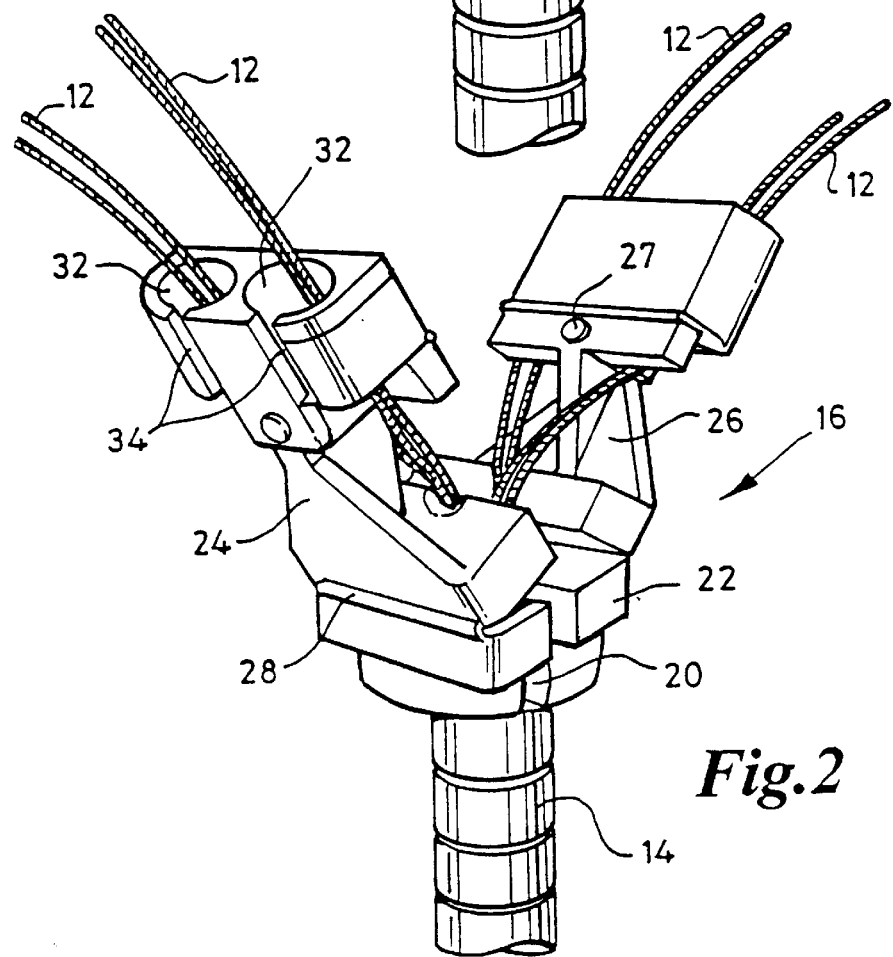

As can be seen in FIG. 2, when the tube 10 is aligned with the centre of the manifold, the individual fibres 12 can be manoeuvred on either side of the arms 24, 26 and can then be introduced into outlet channels 32 through lateral access openings 34. The channels 32 are of much greater diameter than the fibres 12, and allow for the retention of a bend limiting sleeve (similar to sleeve 14) to be received in the channels and to protect the fibres 12 as they leave the outlet channels 32.

Once the fibre has been arranged as shown in FIG. 2, the arms 24, 26 can be closed to take up the position as shown in FIG. 3 and at this point the cable element 10 is trapped and cannot be removed laterally from the manifold. The fibres 12 leaving the manifold through the outlet channels 32 are all substantially parallel to one another, and the surfaces which the fibres contact within the manifold are all radiused to provide a smooth, limited bending, path for the fibres.

In order to hold the two arms together, in the position shown in FIG. 3, the back of the arm 26 has a stud 27 which snaps into a corresponding socket (not shown) in the back of the arm 24.

For ease of moulding, the extremities of the arms 24, 26 which carry the outlet channels 32 can be connected to the lower parts of the arms by live hinges 29 and then folded about these hinges after moulding to take up the position shown in FIGS. 1 to 3 at the ends of the arms. The extremities can then be fixed in position by snap fasteners at 31.

Figure 4:
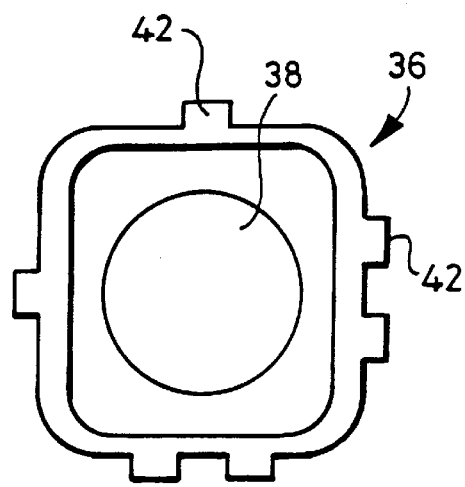
FIG. 4 is an end view of a sleeve for use with the manifold of FIGS. 1 to 3.

Finally, in order to close the access openings 34 a collar 36 (FIG. 3) is slid axially over the manifold 16. As can be seen in FIG. 4, the bottom of the collar 36 has a circular opening 38 and the circular part 18 of the manifold base will be received in this opening. The circular part 18 can have radial slits and a lower lip, so that it is a snap-locking fit in the opening 38.

Figure 5:
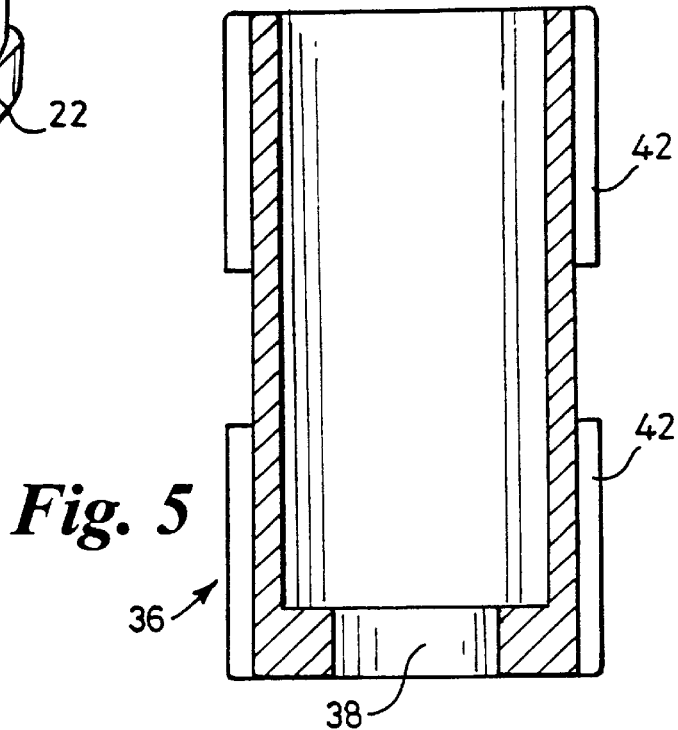
FIG. 5 is a cross-section through the sleeve of FIG. 4.

The collar shown in FIGS. 4 and 5 differs slightly from the collar shown in FIG. 3 in that different numbers of external ribs are provided. The external rib 40 in FIG. 3 and 42 in FIGS. 4 and 5 are intended to allow the collar shown to mate with an adjacent collar so that a number of manifolds can be arranged side by side in a compact block.

The outlet channel 32, as well as the inlet channel at the base of the manifold may include retaining clips for retaining a bend limiting sleeve.

Figure 6:
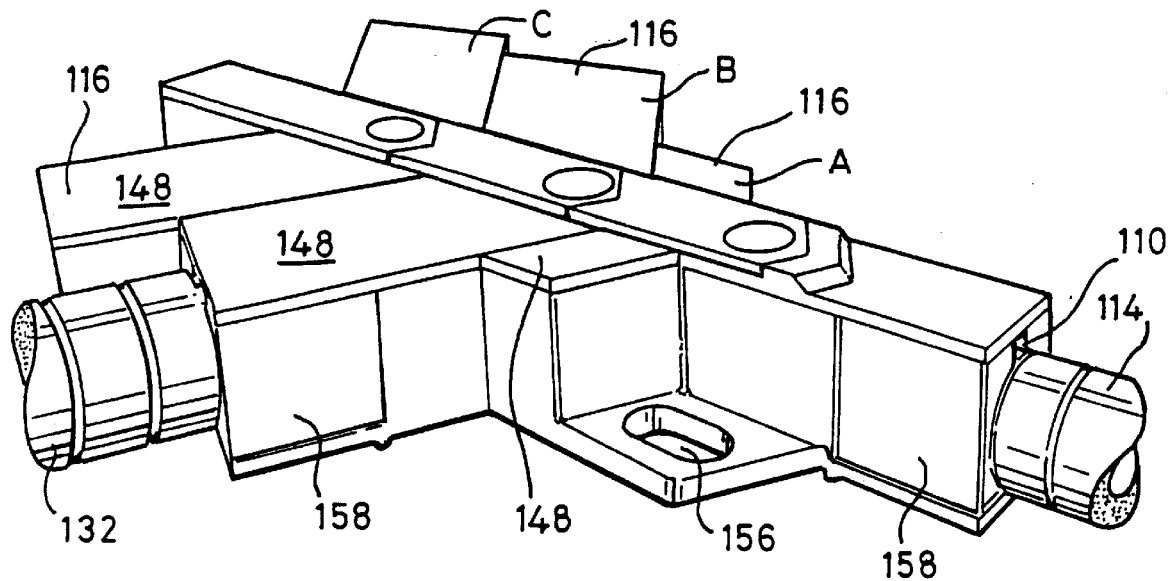
FIG. 6 is an assembled view of a second embodiment of manifold in accordance with the invention.
Figure 7:
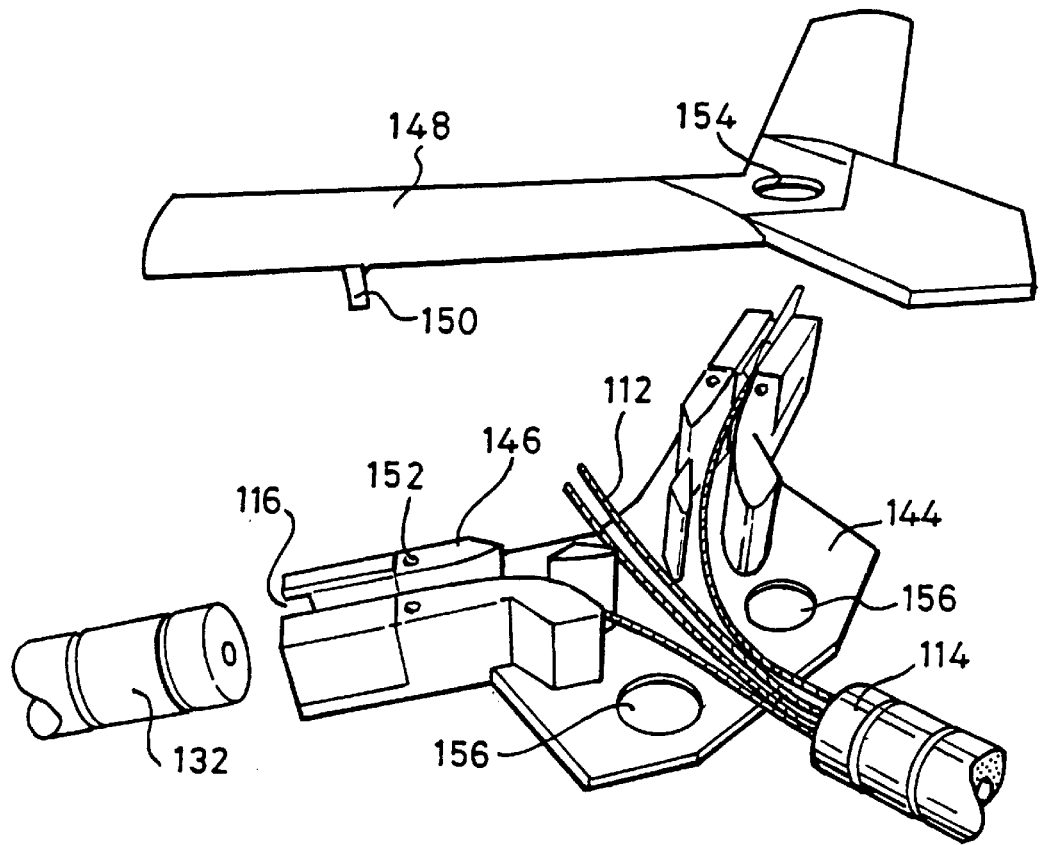
FIG. 7 is an exploded view of a module making up part of the manifold of FIG. 6.

In the second embodiment shown in FIGS. 6 and 7, fibre enters an inlet channel 110 and leaves through outlet channels one of which is shown at 116. It will be seen that the outlet channels 116 diverge from the inlet channel 110 and that the overall arrangement is in the nature of a chevron configuration.

Depending on the number of outlet channels required, the manifold of FIGS. 6 and 7 is made up from a number of different modules. One module is shown in FIG. 7 and comprises a base 144 on which guide walls 146 are mounted. As can be seen in FIG. 7, the individual fibres 112 are guided out either to the right or to the left or pass straight through, to be divided to the right or to the left in the next module. Because the guide channels for the fibres are all open at the top, the fibres can be simply laid in their intended positions. The channels are then closed by a lid 148 which has downwardly extending spigots 150 which plug into sockets 152 in the walls 146.

The contours of the walls 146 are such as to guide the fibres 112 around curves of a radius no smaller than the smallest permissible bend radius for those fibres.

The base plates 144 of the modules will be provided with inter-engagement features so that any number of modules can be connected together in line. The lead module to which the inlet tube 110 is fitted may be of a different design to tee subordinate modules. FIG. 6 shows three inter-connected modules denoted by the letters A, B and C. A is a lead module and B and C are subordinate modules. Each module has a lid 148, and FIG. 6 shows how a spigot on the underside of the leading end of each module plugs into a socket 154 on the preceding module. The lead module A also has attachment holes 156 by which the manifold assembly can be secured to a substrate or any other fixed structure.

FIG. 6 also shows that bend limiting tubes 114, 132 are received in retainer clips 158 which grip the outer surface of the tubes 114, 132 to retain them axially.

Both the manifolds described here allow individual fibres or groups of fibres to be broken out from a cable element tube, without having to thread the fibres individually through outlet channels. The embodiment of FIGS. 1–3 does require that the cable element tube be initially threaded through the collar 36, but even this requirement could be avoided by providing an axial slit in the collar, provided that that slit does not in the finished tube marry up with any of the lateral access openings 34.

The manifolds described can be of a small size so that they do not take up unnecessary space in a cable layout.

We claim:

1. An optical fibre manifold having a body and a body closure, wherein the body has an inlet mouth leading to an inlet channel, a plurality of outlet channels communicating with the inlet channel and an outlet mouth leading from each outlet channel, the inlet and outlet mouths being adapted to receive fibre protection sleeves introduced into the mouths in an axial direction and to retain sleeves thus introduced against radial and axial movement, wherein fibre can be placed laterally into the inlet channel, into the outlet channels and into the inlet and outlet mouths before the body closure is brought into its closing position on the body, and after the body closure is brought into position, lateral access to the inlet and outlet channels is closed and wherein each fibre passage leading, within the manifold, from an inlet to an outlet is configured to guide the fibre through the passage in such a way as to avoid any impairment of the optical and/or mechanical performance characteristics of the fibre.

2. An optical fibre manifold as claimed in claim 1, and having a single inlet channel with a plurality of associated outlet channels.

3. An optical fibre manifold as claimed in claim 1 or 2, which is adapted to be connected to other manifolds of the same design to form a single manifold structure.

4. An optical fibre manifold as claimed in claim 1, which comprises a plastics moulding which can be moved between the first and second positions by bending live hinges to open and close a lateral access channel.

5. An optical fibre manifold as claimed in claim 1, including a sleeve which can be applied to the manifold structure to close lateral access channels.

6. An optical fibre manifold as claimed in claim 1, wherein either the inlet channel or the outlet channels or both include means for connection to a bend limiting sleeve along which a fibre protection sleeve can be passed.

7. An optical fibre manifold as claimed in claim 6, wherein the connection means retains the bend limiting sleeve to provide a secure connection between the manifold and the bend limiting tube.

8. An optical fibre manifold as claimed in claim 1, wherein the channels have a large diameter mouth and a smaller diameter fibre routing section aligned with the mouth.

9. An optical fibre manifold as claimed in claim 8, wherein each mouth is a bell-shaped mouth with radiused edges to prevent the fibre being bent sharply.

10. An optical fibre manifold as claimed in claim 8, wherein each mouth is a cylindrical section adapted to receive an end of a cable element tube, which may be a bend-limiting tube, within which the fibre is carried.

11. An optical fibre manifold as claimed in claim 10, wherein the cylindrical section has a diameter in the range from 5 mm to 6 mm.

12. An optical fibre manifold as claimed in claim 1, wherein the fibre routing section is capable of accommodating one or more fibres.

13. An optical fibre manifold as claimed in any one of claims 8 to 12, wherein any bends in the channels have a minimum bend radius of 30 mm.

* * * * *